(12) United States Patent
Peng et al.

(10) Patent No.: US 8,417,030 B2
(45) Date of Patent: Apr. 9, 2013

(54) METHOD OF IMAGE EDGE ENHANCEMENT

(75) Inventors: Mao Peng, Shenzhen (CN); Wenge Hu, Shenzhen (CN); Jingjun Fu, Shenzhen (CN)

(73) Assignee: BYD Company, Ltd., Shenzhen (CN)

( * ) Notice: Subject to any disclaimer, the term of this patent is extended or adjusted under 35 U.S.C. 154(b) by 1176 days.

(21) Appl. No.: 12/274,314

(22) Filed: Nov. 19, 2008

(65) Prior Publication Data

US 2009/0141999 A1     Jun. 4, 2009

(30) Foreign Application Priority Data

Dec. 4, 2007  (CN) .......................... 2007 1 0077567

(51) Int. Cl.
| | |
|---|---|
| *G06K 9/00* | (2006.01) |
| *G06K 9/46* | (2006.01) |
| *G06K 9/66* | (2006.01) |
| *G06K 9/62* | (2006.01) |
| *G06K 9/32* | (2006.01) |
| *G06K 9/40* | (2006.01) |
| *G06K 1/00* | (2006.01) |
| *H04N 5/262* | (2006.01) |
| *H04N 7/01* | (2006.01) |
| *H04N 11/20* | (2006.01) |
| *H04N 1/46* | (2006.01) |
| *G06F 15/00* | (2006.01) |

(52) U.S. Cl. ........ 382/167; 382/195; 382/224; 382/266; 382/300; 348/240.2; 348/441; 358/525

(58) Field of Classification Search .................. 382/162, 382/167, 181, 190, 195, 199, 205–206, 224, 382/254–255, 260–261, 263–264, 266, 268–275, 382/276, 293, 298–301; 348/207.99, 222.1, 348/240.99, 240.1, 240.03, 234, 237, 252, 348/266, 272–273, 441, 446–450, 453; 358/1.2, 358/500, 518, 525; 345/581, 589, 606

See application file for complete search history.

(56) References Cited

U.S. PATENT DOCUMENTS 5,050,227 A * 9/1991 Furusawa et al. ............. 382/269
5,373,322 A * 12/1994 Laroche et al. ............... 348/273
(Continued)

OTHER PUBLICATIONS

Edward Chang, Shiufun Cheung, and Davis Y. Pan; Color filter array recovery using a threshold-based variable number of gradients, Proc. SPIE 3650, 36 (1999).*

(Continued)

*Primary Examiner* — Randolph Chu
*Assistant Examiner* — Nathan Bloom
(74) *Attorney, Agent, or Firm* — Morgan Lewis & Bockius LLP (57) ABSTRACT

A method of image edge enhancement comprises: determining the edge trend for an image in accordance with the second order gradient value of a center pixel in different directions; performing interpolation operation with the center pixel; calculating absent color component of pixels; performing edge enhancement for the image in the interpolation module in accordance with original color component of the center pixel and the image edge trend based on the Bayer data. The image edge enhancement process takes into account the influence of the green component values of different pixels surrounding the center pixel, and adopts a noise-resistant, self-adaptive edge enhancement algorithm, to suppress noise on the image edge. Thus, the resulting image has a clear image edge. In addition, the fact that the process performs image edge enhancement in the interpolation module based on the Bayer data can significantly reduce the consumption of memory space.

15 Claims, 3 Drawing Sheets

U.S. PATENT DOCUMENTS

| | | | | |
|---|---|---|---|---|
| 5,629,734 | A | * | 5/1997 | Hamilton et al. ............ 348/222.1 |
| 6,091,862 | A | * | 7/2000 | Okisu ............................ 382/300 |
| 6,674,903 | B1 | * | 1/2004 | Cliquet .......................... 382/199 |
| 2001/0045988 | A1 | * | 11/2001 | Yamauchi et al. ............. 348/273 |
| 2002/0167602 | A1 | * | 11/2002 | Nguyen ......................... 348/280 |
| 2003/0081465 | A1 | * | 5/2003 | Cho ............................... 365/200 |
| 2004/0075755 | A1 | * | 4/2004 | Rantanen et al. ......... 348/231.99 |
| 2004/0179752 | A1 | * | 9/2004 | Cheng et al. .................. 382/300 |
| 2005/0190993 | A1 | * | 9/2005 | Chang ........................... 382/300 |
| 2007/0292022 | A1 | * | 12/2007 | Nilsson et al. ................ 382/167 |
| 2010/0039563 | A1 | * | 2/2010 | Lukac ........................... 348/663 |

OTHER PUBLICATIONS

Moriya, S.; Makita, J.; Kuno, T.; Matoba, N.; Sugiura, H.; , "Advanced demosaicing methods based on the changes of colors in a local region," Consumer Electronics, IEEE Transactions on , vol.52, No. 1, pp. 206-214, Feb. 2006.*

King-Hong Chung; Yuk-Hee Chan; , "A Low-Complexity Joint Color Demosaicking and Zooming Algorithm for Digital Camera," Image Processing, IEEE Transactions on , vol. 16, No. 7, pp. 1705-1715, Jul. 2007.*

Shu-Yu Zhu, Konstantinos N. Plataniotis, and Anastasios N. Venetsanopoulos, Comprehensive analysis of edge detection in color image processing, Opt. Eng. 38, 612 (1999).*

S. Battiato, M. Guarnera, G. Messina, and V. Tomaselli. Recent patents on color demosaicing. Recent Patents on Computer Science, 1(3):194-207, Nov. 2008.*

X. Li, B. Gunturk, and L. Zhang. Image demosaicing: a systematic survey. vol. 6822, p. 68221J. SPIE, 2008.*

Z. Doychev, Basics of Medical Image Segmentation and Registration: Edge Detection and Feature Extraction, coursework presentation material available Dec. 9, 2005, Chair for Computer Aided Medical Procedures & Augmented Reality; Technical University Munich, http://campar.in.tum.de/.*

* cited by examiner

Figure 1

| $B_{11}$ | $G_{12}$ | $B_{13}$ | $G_{14}$ | $B_{15}$ |
|---|---|---|---|---|
| $G_{21}$ | $R_{22}$ | $G_{23}$ | $R_{24}$ | $G_{25}$ |
| $B_{31}$ | $G_{32}$ | $B_{33}$ | $G_{34}$ | $B_{35}$ |
| $G_{41}$ | $R_{42}$ | $G_{43}$ | $R_{44}$ | $G_{45}$ |
| $B_{51}$ | $G_{52}$ | $B_{53}$ | $G_{54}$ | $B_{55}$ |

Figure 2

| $R_{11}$ | $G_{12}$ | $R_{13}$ | $G_{14}$ | $R_{15}$ |
|---|---|---|---|---|
| $G_{21}$ | $B_{22}$ | $G_{23}$ | $B_{24}$ | $G_{25}$ |
| $R_{31}$ | $G_{32}$ | $R_{33}$ | $G_{34}$ | $R_{35}$ |
| $G_{41}$ | $B_{42}$ | $G_{43}$ | $B_{44}$ | $G_{45}$ |
| $R_{51}$ | $G_{52}$ | $R_{53}$ | $G_{54}$ | $R_{55}$ |

Figure 3

| $G_{11}$ | $B_{12}$ | $G_{13}$ | $B_{14}$ | $G_{15}$ |
|---|---|---|---|---|
| $R_{21}$ | $G_{22}$ | $R_{23}$ | $G_{24}$ | $R_{25}$ |
| $G_{31}$ | $B_{32}$ | $G_{33}$ | $B_{34}$ | $G_{35}$ |
| $R_{41}$ | $G_{42}$ | $R_{43}$ | $G_{44}$ | $R_{45}$ |
| $G_{51}$ | $B_{52}$ | $G_{53}$ | $B_{54}$ | $G_{55}$ |

Figure 4

| $G_{11}$ | $R_{12}$ | $G_{13}$ | $R_{14}$ | $G_{15}$ |
|---|---|---|---|---|
| $B_{21}$ | $G_{22}$ | $B_{23}$ | $G_{24}$ | $B_{25}$ |
| $G_{31}$ | $R_{32}$ | $G_{33}$ | $R_{34}$ | $G_{35}$ |
| $B_{41}$ | $G_{42}$ | $B_{43}$ | $G_{44}$ | $B_{45}$ |
| $G_{51}$ | $R_{52}$ | $G_{53}$ | $R_{54}$ | $G_{55}$ |

Figure 5

METHOD OF IMAGE EDGE ENHANCEMENT

CROSS-REFERENCE TO RELATED APPLICATION

This application claims priority to and benefit of Chinese Patent Application Serial No. 200710077567.9, filed in the State Intellectual Property Office of the P.R. China on Dec. 4, 2007, the entire contents of which are incorporated herein by reference.

FIELD OF THE INVENTION

The present invention relates to image processing, and in particular to a method of image edge enhancement.

BACKGROUND OF THE INVENTION

A digital image's quality can be improved by enhancing the image's edge. Conventional methods of image edge enhancement often require an interpolation operation of an image to obtain a full color RGB image followed by a second-order Laplace operation and edge trend specific operation of the full color RGB image to enhance the image's edge. These methods are not only computationally expensive, but also require a large amount of memory space, e.g., a pre-storage of two to four rows of RGB data would occupy six to twelve rows of static random access memory (SRAM).

SUMMARY OF THE INVENTION

The purpose of embodiments of the present invention is to provide a method of image edge enhancement to solve or alleviate the aforementioned problems associated with the conventional approaches.

One embodiment of the present invention comprises the steps of: determining the edge trend of an image in accordance with the second order gradient value of a center pixel in different directions; performing interpolation operation for the center pixel and calculating the absent color components of the center pixel; performing the edge enhancement operation for the image in the interpolation module in accordance with original color components of the center pixel and the image edge trend based on the Bayer data.

In some embodiments of the present invention, the image edge enhancement process takes into account the influence of the green component values of different pixels surrounding the center pixel, and adopts a noise-resistant, self-adaptive edge enhancement algorithm, to suppress noise on the image edge. Thus, the resulting image has a clear image edge. In addition, the fact that the process performs image edge enhancement in the interpolation module based on the Bayer data can significantly reduce the consumption of memory space.

DESCRIPTION OF THE DRAWINGS

The aforementioned features and advantages of the invention as well as additional features and advantages thereof will be more clearly understood hereinafter as a result of a detailed description of embodiments when taken in conjunction with the drawings.

Like reference numerals refer to corresponding parts throughout the several views of the drawings.

DESCRIPTION OF THE EMBODIMENTS

The aforementioned features and advantages of the invention as well as additional features and advantages thereof will be more clearly understood hereinafter as a result of a detailed description of the following embodiments when taken in conjunction with the drawings.

In some embodiments of the present invention, the edge enhancement operation independently processes as many pixels along the same edge as possible and then takes the average of the processing results associated with the pixels to suppress the noise influence on the edge. The operation includes: using a 3×5 Bayer matrix and a 5×3 Bayer matrix to determine the second order gradient values in the horizontal and vertical directions, respectively and using a 5×5 Bayer matrix to determine the second order gradient values in 135 degree direction and in 45 degree direction, respectively, so as to determine the image's edge trend and perform a corresponding edge enhancement scheme accordingly.

An image edge is represented by the brightness contrast on two sides of the edge, one side being relatively bright and the other side being relatively dark. The bigger the contrast between the bright side and the dark side is, the more outstanding the edge is. The pixels on or near the image edge are located either on the bright side or on the dark side. Either a brightness decrease of the pixels on the dark side or a brightness increase of the pixels on the bright side or both can achieve the edge enhancement effect for the image.

Figure 1:
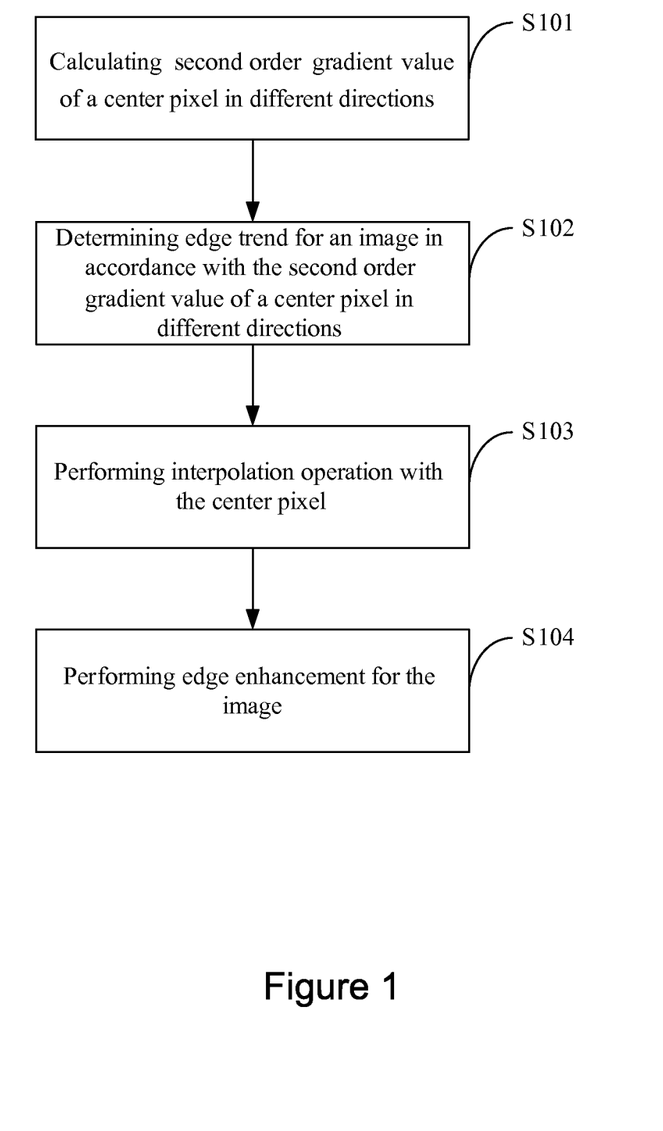
FIG. 1 is a flow chart illustrating one embodiment of the image edge enhancement process.

FIG. 1 is a flow chart illustrating one embodiment of the image edge enhancement process as follows:

Step S101 is to determine the second order gradient value for the center pixel in different directions.

In one embodiment of the present invention, a 3×5 Bayer matrix and a 5×3 Bayer matrix are used to determine the center pixel's second order gradient value H in the horizontal direction and the center pixel's second order gradient value V in the vertical direction, respectively. A 5×5 Bayer matrix is used to determine the center pixel's second order gradient value X in 135 degree direction and the center pixel's second order gradient value Y in 45 degree direction.

Figure 2:
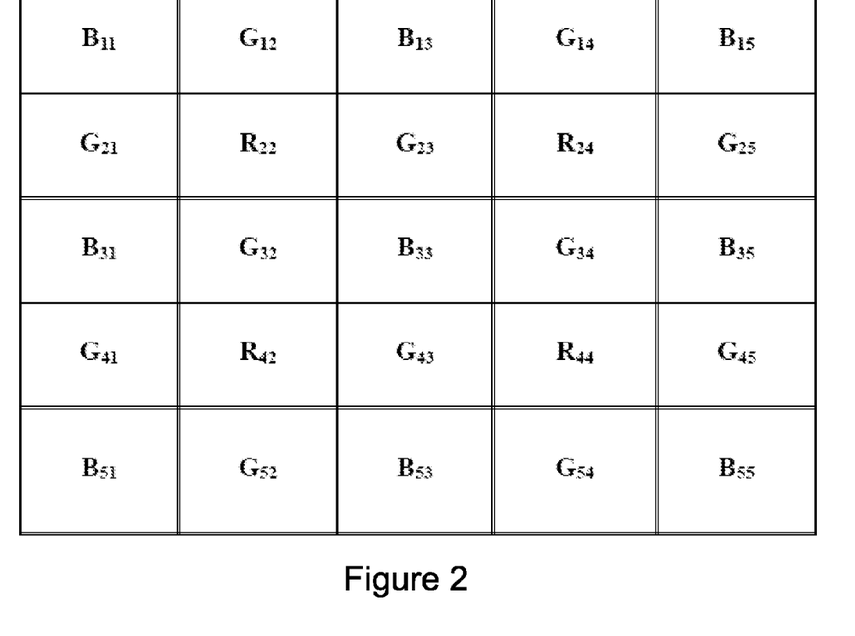
FIG. 2 is a distribution pattern based on the Bayer mode in which the pixels surround a center pixel's blue (B) component of the original image.

In some embodiments of the present invention, if the original component of the center pixel is blue, as shown in FIG. 2, the second order gradient value H in the horizontal direction of the center pixel $B_{33}$ is:

$$H = \frac{2H_1 + H_2 + H_3}{4}$$

wherein, $H_1 = |G_{32} - G_{34}| + |2B_{33} - B_{31} - B_{35}|;$ $H_2 = |R_{22} - R_{24}| + |2G_{23} - G_{21} - G_{25}|;$ $H_3 = |R_{42} - R_{44}| + |2G_{43} - G_{41} - G_{45}|.$ And the second order gradient value V in the vertical direction of the center pixel $B_{33}$ is:

$$V = \frac{2V_1 + V_2 + V_3}{4}$$

wherein, $V_1=|G_{23}-G_{43}|+|2B_{33}-B_{13}-B_{53}|;$ $V_2=|R_{22}-R_{42}|+|2G_{32}-G_{12}-G_{52}|;$ $V_3=|R_{24}-R_{44}|+|2G_{34}-G_{14}-G_{54}|.$ The second order gradient value X in the 135 degree direction is:

$X=|R_{22}-R_{44}|+|2B_{33}-B_{11}-B_{55}|.$

The second order gradient value Y in the 45 degree direction is:

$Y=|R_{24}-R_{42}|+|2B_{33}-B_{15}-B_{51}|.$

Figure 3:
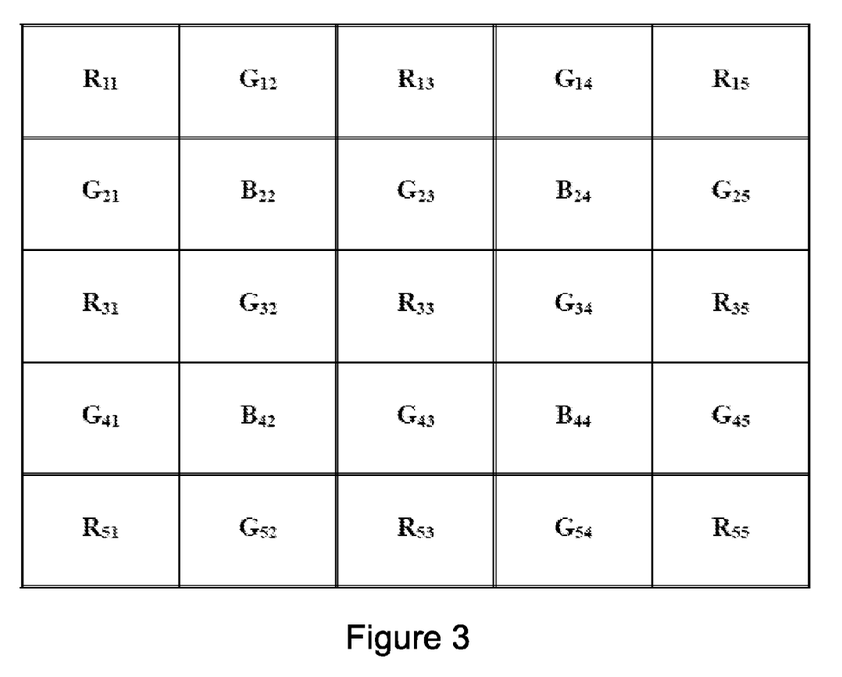
FIG. 3 is a distribution pattern based on the Bayer mode in which the pixels surround a center pixel's red (R) component of the original image.

If the original component of the center pixel is red, as shown in FIG. 3, the second order gradient value H in the horizontal direction of the center pixel $R_{33}$ is:

$$H = \frac{2H_1 + H_2 + H_3}{4}$$

wherein, $H_1=|G_{32}-G_{34}|+|2R_{33}-R_{31}-R_{35}|;$ $H_2=|B_{22}-B_{24}|+|2G_{23}-G_{21}-G_{25}|;$ $H_3=|B_{42}-B_{44}|+|2G_{43}-G_{41}-G_{45}|.$ And the second order gradient value V in the vertical direction of the center pixel $R_{33}$ is:

$$V = \frac{2V_1 + V_2 + V_3}{4}$$

wherein, $V_1=|G_{23}-G_{43}|+|2R_{33}-R_{13}-R_{53}|;$ $V_2=|B_{22}-B_{42}|+|2G_{32}-G_{12}-G_{52}|;$ $V_3=|B_{24}-B_{44}|+|2G_{34}-G_{14}-G_{54}|.$ The second order gradient value X in the 135 degree direction is:

$X=|B_{22}-B_{44}|+|2R_{33}-R_{11}-R_{55}|.$

The second order gradient value Y in the 45 degree direction is:

$Y=|B_{24}-B_{42}|+|2R_{33}-R_{15}-R_{51}|.$

Figure 4:
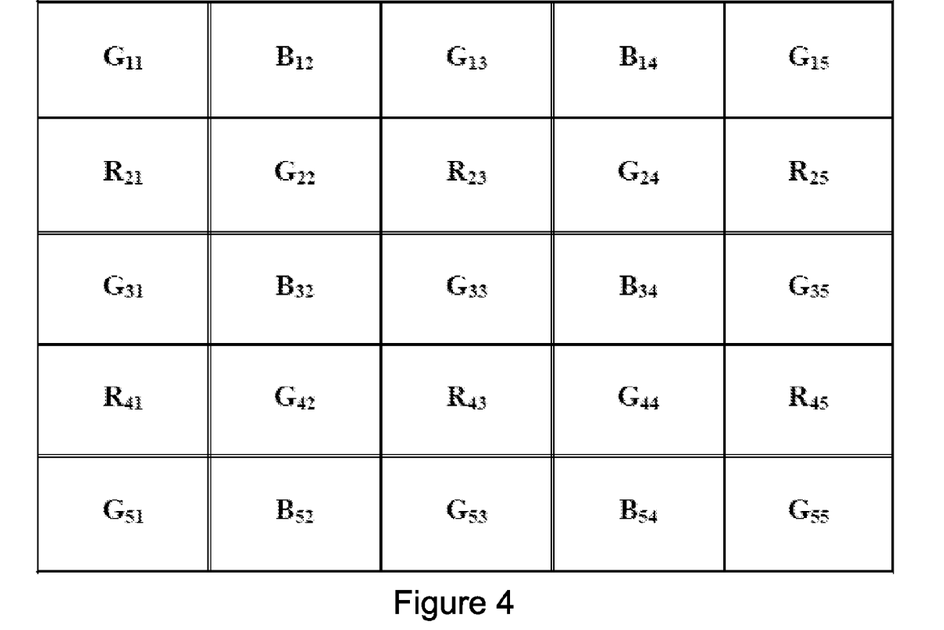
FIG. 4 is a distribution pattern based on the Bayer mode in which the pixels surround a center pixel's green (G) component of the original image and the corresponding row includes the B component of the original pixel values.

If the original component of the center pixel is green and its left and right adjacent pixels are blue, as shown in FIG. 4, the second order gradient value H in the horizontal direction of the center pixel $G_{33}$ is:

$$H = \frac{2H_1 + H_2 + H_3}{4}$$

wherein, $H_1=|B_{32}-B_{34}|+|2G_{33}-G_{31}-G_{35}|;$ $H_2=|G_{22}-G_{24}|+|2R_{23}-R_{21}-R_{25}|;$ $H_3=|G_{42}-G_{44}|+|2R_{43}-R_{41}-R_{45}|.$ And the second order gradient value V in the vertical direction of the center pixel $G_{33}$ is:

$$V = \frac{2V_1 + V_2 + V_3}{4}$$

wherein, $V_1=|R_{23}-R_{43}|+|2G_{33}-G_{13}-G_{53}|;$ $V_2=|G_{22}-G_{42}|+|2B_{32}-B_{12}-B_{52}|;$ $V_3=|G_{24}-G_{44}|+|2B_{34}-B_{14}-B_{54}|.$ The second order gradient value X in the 135 degree direction is:

$X=|2G_{33}-G_{22}-G_{44}|+|2G_{33}-G_{11}-G_{55}|.$

The second order gradient value Y in the 45 degree direction is:

$Y=|2G_{33}-G_{24}-G_{42}|+|2G_{33}-G_{15}-G_{51}|.$

Figure 5:
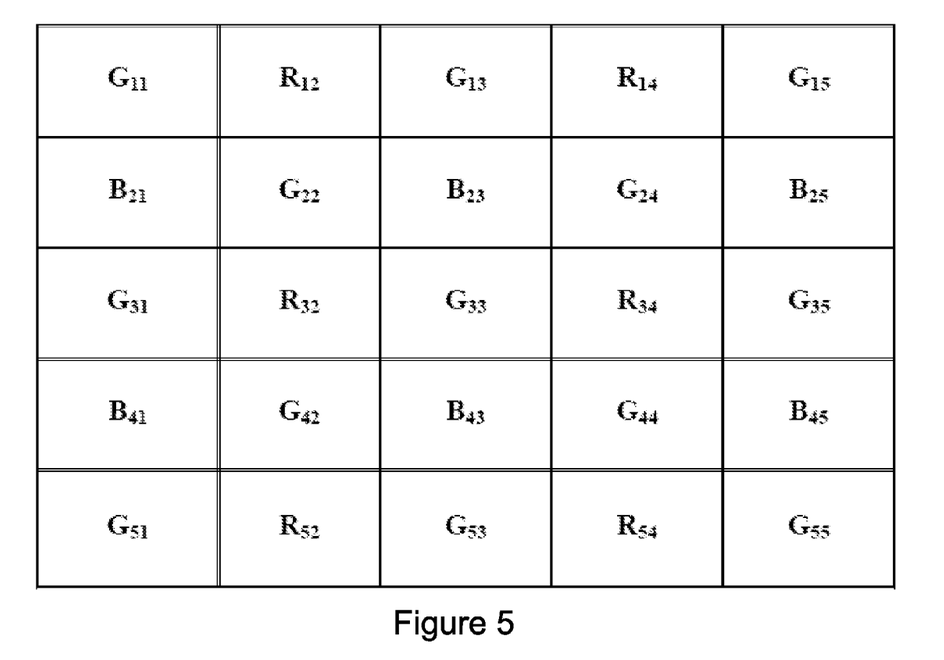
FIG. 5 is a distribution pattern based on the Bayer mode in which the pixels surround a center pixel's green (G) component of the original image and the corresponding row includes the R component of the original pixel values.

If the original component of the center pixel is green and its left and right adjacent pixels are red, as shown in FIG. 5, the second order gradient value H in the horizontal direction of the center pixel $G_{33}$ is:

$$H = \frac{2H_1 + H_2 + H_3}{4}$$

wherein, $H_1=|R_{32}-R_{34}|+|2G_{33}-G_{31}-G_{35}|;$ $H_2=|G_{22}-G_{24}|+|2B_{23}-B_{21}-B_{25}|;$ $H_3=|G_{42}-G_{44}|+|2B_{43}-B_{41}-B_{45}|.$ And the second order gradient value V in the vertical direction of the center pixel $G_{33}$ is:

$$V = \frac{2V_1 + V_2 + V_3}{4}$$

wherein, $V_1=|B_{23}-B_{43}|+|2G_{33}-G_{13}-G_{53}|;$ $V_2=|G_{22}-G_{42}|+|2R_{32}-R_{12}-R_{52}|;$ $V_3=|G_{24}-G_{44}|+|2R_{34}-R_{14}-R_{54}|.$ The second order gradient value X in the 135 degree direction is:

$X=|2G_{33}-G_{22}-G_{44}|+|2G_{33}-G_{11}-G_{55}|$

The second order gradient value Y in the 45 degree direction is:

$Y=|2G_{33}-G_{24}-G_{42}|+|2G_{33}-G_{15}-G_{51}|.$

Step S102 is to determine the edge trend of the image in accordance with the second order gradient value of the center pixel in different directions.

In some embodiments of the present invention, the maximum Max_$_{HV}$ and the minimum Min_$_{HV}$ of H and V, the maximum Max_$_{XY}$ and the minimum Min_$_{XY}$ of X and Y, are calculated respectively. Max_$_{HV}$ and Max_$_{XY}$ are compared with a predefined flat region threshold value TH_$_{flat}$.

If both Max_$_{HV}$ and Max_$_{XY}$ are smaller than TH_$_{flat}$, the center pixel is deemed to be a pixel in a flat region, i.e. no edge enhancement is necessary.

If at least one of Max_$_{HV}$ and Max_$_{XY}$ is greater than or equal to TH_$_{flat}$, Min_$_{HV}$ is compared with Min_$_{XY}$. If Min_$_{HV}$<Min_$_{XY}$ and H−V<−TH_$_{edge}$, wherein TH_$_{edge}$ is a predefined edge region threshold value, the center pixel is deemed to be a pixel on the horizontal edge; if Min_$_{HV}$<Min_$_{XY}$ and H−V>TH_$_{edge}$, the center pixel is deemed to be a pixel on the vertical edge. If Min_$_{HV}$>Min_$_{XY}$ and X−Y<−TH_$_{edge}$, the center pixel is deemed to be a pixel on the 135 degree edge; if Min_$_{HV}$>Min_$_{XY}$ and X−Y>TH_$_{edge}$, the center pixel is deemed to be a pixel on the 45 degree edge.

A pixel that does not match any of the above-mentioned four scenarios is deemed to be a pixel in a non-flat, non-edge, generic region. In this case, edge enhancement operation is optional.

A software program implementing the aforementioned process is as follows:

If (Max_$_{HV}$ and Max_$_{XY}$ are both less than TH_$_{flat}$) {treat the center pixel as a pixel in the flat region;}
else if (Min_$_{HV}$<Min_$_{XY}$ and |H−V|>TH_$_{edge}$) and
  If (H<V) {treat the center pixel as a pixel on the horizontal edge;}
  else {treat the center pixel as a pixel on the vertical edge;}
else if (Min_$_{XY}$<Min_$_{HV}$ and |X−Y|>TH_$_{edge}$) and
  If (X<Y) {treat the center pixel as a pixel on the 135 degree edge;}
  else {treat the center pixel as a pixel on the 45 degree edge;}
else {treat the center pixel as a pixel in the generic region;}

The step S103 is to perform interpolation operation for the center pixel along the edge and to calculate absent color components of the pixel.

In one embodiment of the present invention, the interpolation operation begins with building a 5×5 Bayer matrix by treating the pixel to be interpolated as the center pixel, selecting an interpolation scheme according to the determined color variation trend, and calculating two interpolating component values of the center pixel using the selected interpolation scheme in consideration of the color continuity and the edge continuity at the center pixel. In some embodiments, the color variation trend is consistent with the aforementioned edge detection result.

After the interpolation operation, all the three color components of the center pixel, i.e., ($R_{33}$, $G_{33}$, $B_{33}$), are determined.

The step S104 is to perform edge enhancement for the image in accordance with the original color components of the center pixel, the edge trend of the image, and the Bayer data.

In some embodiments of the present invention, the color change of the center pixel should remain roughly the same after the edge enhancement. Assuming the center pixel's surrounding pixels have the same color but different brightness, the conversion formula from the RGB space to the YCbCr space is as follows:

$$Y = 0.299*R + 0.587*G + 0.114*B \quad (1)$$

$$Cb = 0.1687*R - 0.3313*G + 0.5*B \quad (2)$$

$$Cr = 0.5*R - 0.4187*G - 0.0813*B \quad (3)$$

wherein,
Y is the brightness component,
Cb is the blue-difference chroma component, and
Cr is the red-difference chroma component.

Note that, according to the formulae (1), (2) and (3), if R, G and B vary by the amount "Diff", Cb and Cr remain the unchanged and Y varies by the same amount "Diff". In other words, the variation amount "Diff" determined from one color component can be applied to the other two color components. As a result of edge enhancement according to some embodiments of the present invention, the color of the center pixel after edge enhancement does not change, but the brightness component Y at the edge is enhanced.

In some embodiments of the present invention, the edge enhancement operation comprises the following steps:

Step 1: Determine the brightness of the edge center ($Y\_center$) by averaging the brightness on both sides of the edge;

Step 2: Determine the difference between the brightness of the center pixel ($Y_{33}$) and the brightness of the edge center ($Y\_center$), i.e., En_$_{Diff}$=$Y_{33}$−$Y\_center$;

Step 2.1: If En_$_{Diff}$<0, the center pixel is located on the dark side of the image edge;

Step 2.2: If En_$_{Diff}$>0, the center pixel is located on the bright side of the image edge;

Step 3: Multiply the brightness difference (En_$_{Diff}$) by a gain factor (Edge_$_{Gain\_t}$) and define the new brightness of the center pixel ($Y_{33\_new}$) as follows:

$$Y_{33\_new} - Y\_center = Edge\_{Gaint\_t} * En\_Diff,$$

i.e., $Y_{33\_new} = Y\_center + Edge\_{Gaint\_t} * En\_Diff.$

By plugging the definition of $Y\_center$, i.e., $Y\_center = Y_{33} - En\_Diff$ into the equation above, the new brightness of the center pixel ($Y_{33\_new}$) is expressed as follows:

$$Y_{33\_new} = Y_{33} - En\_Diff + Edge_{Gaint\_t} * En\_Diff$$
$$= Y_{33} + (Edge_{Gaint\_t} - 1) * En\_Diff$$
$$= Y_{33} + Edge_{Gain} * En\_Diff$$

wherein Edge_$_{Gain}$ is the amplification parameter whose range is 0~3, and the default value is 1.

According to the RGB-YCbCr conversion formulae (1)-(3), Y varies by Diff while Cb and Cr remain the same when R, G and B all vary by Diff. Thus, this edge enhancement scheme only needs to determine the variation of one color component, which can be applied to the other two components. In other words, this edge enhancement scheme enhances the brightness of the center pixel without altering its color. In some embodiments, considering that the number of green pixels is twice the number of red or blue pixels, the scheme first performs edge enhancement to the green component G of the center pixel to determine En_$_{Diff\_G}$, and then performs respectively edge enhancement to the red component R and the blue component B. After the edge enhancement, the new values of the three color components of the center pixel are determined in accordance with following equations:

$R_{33\_new} = R_{33} + Edge\_Gain * En\_Diff\_G;$ $G_{33\_new} = G_{33} + Edge\_Gain * En\_Diff\_G;$ $B_{33\_new} = B_{33} + Edge\_Gain * En\_Diff\_G.$ Below is the respective description of various edge enhancement scenarios in connection with the original color component of the center pixel and the image's edge trend at the center pixel:

Scenario One:

The original color component of the center pixel is blue and perform the edge enhancement to the center pixel as shown in FIG. 2.

Option (1):

If $Min\__{HV} < Min\__{XY}$ and $H-V \leq -TH\_{edge}$, treat the center pixel as a pixel on the horizontal edge and perform edge enhancement to the center pixel on the horizontal edge.

Step (a):

Determine the difference ($En\_{Diff\_G\_cen}$) between the value of the green component of the center pixel ($G_{33}$) and the value of the green component of the edge center of the edge at which the center pixel (3,3) is located.

First, the value ($G\_{center}$) of the green component of the edge center is defined as:

$$G\_{center} = \frac{1}{2}\left[\frac{1}{2}(G_{13} + G_{53}) + \frac{1}{2}(G_{23} + G_{43})\right] \quad (1.1)$$

In the formula (1.1), $G_{23}$ and $G_{43}$ are known, but $G_{13}$ and $G_{53}$ are unknown. Because the center pixel is deemed to be a pixel on the horizontal edge, $G_{13}$ and $G_{53}$ can be treated as pixels on the horizontal edge, i.e., $$G_{13} = \frac{1}{2}(G_{12} + G_{14}) \quad (1.2)$$

$$G_{53} = \frac{1}{2}(G_{52} + G_{54}) \quad (1.3)$$

Note that the green component difference ($En\_{Diff\_G\_cen}$) is defined as:

$$En\_{Diff\_G\_cen} = G_{33} - G\_{center} \quad (1.4)$$

By plugging the formulae (1.1), (1.2), and (1.3) into (1.4), $En\_{Diff\_G\_cen}$ can be expressed as:

$$En\_{Diff\_G\_cen} = G_{33} - \frac{1}{8}[2(G_{23} + G_{43}) + G_{12} + G_{14} + G_{52} + G_{54}] \quad (1.5)$$

Step (b):

Determine the green component difference ($En\_{Diff\_G\_lef}$) associated with the pixel (3, 2) left to the center pixel (3, 3).

First, the value ($G\_{lef\_center}$) of the green component of the edge center corresponding to the pixel (3,2) is defined as:

$$G\_{lef\_center} = \frac{1}{2}\left[\frac{1}{2}(G_{12} + G_{52}) + \frac{1}{2}(G_{22} + G_{42})\right] \quad (1.6)$$

In the formula (1.6), $G_{12}$ and $G_{52}$ are known, but $G_{22}$ and $G_{42}$ are unknown. Because the center pixel is a pixel on the horizontal edge, $G_{22}$ and $G_{42}$ can be treated as a pixel on the horizontal edge, i.e., $$G_{22} = \frac{1}{2}(G_{21} + G_{23}) \quad (1.7)$$

$$G_{42} = \frac{1}{2}(G_{41} + G_{43}) \quad (1.8)$$

Note that the green component difference ($En\_{Diff\_G\_lef}$) is defined as:

$$En\_{Diff\_G\_lef} = G_{32} - G\_{lef\_center} \quad (1.9)$$

By plugging the formulae (1.6), (1.7), and (1.8) into (1.9), $En\_{Diff\_G\_lef}$ can be expressed as:

$$En\_{Diff\_G\_lef} = G_{32} - \frac{1}{8}[2(G_{12} + G_{52}) + G_{21} + G_{23} + G_{41} + G_{43}] \quad (1.10)$$

Step (c):

Determine the green component difference ($En\_{Diff\_G\_rig}$) associated with the pixel (3, 4) right to the center pixel (3, 3).

First, the value ($G\_{rig\_center}$) of the green component of the edge center corresponding to the pixel (3, 4) is defined as:

$$G\_{rig\_center} = \frac{1}{2}\left[\frac{1}{2}(G_{14} + G_{54}) + \frac{1}{2}(G_{24} + G_{44})\right] \quad (1.11)$$

In the formula (1.11), $G_{14}$ and $G_{54}$ are known, but $G_{24}$ and $G_{44}$ are unknown. Because the center pixel is a pixel on the horizontal edge, $G_{24}$ and $G_{44}$ can be treated as a pixel on the horizontal edge, i.e., $$G_{24} = \frac{1}{2}(G_{23} + G_{25}) \quad (1.12)$$

$$G_{44} = \frac{1}{2}(G_{43} + G_{45}) \quad (1.13)$$

Note that the green component difference ($En\_{Diff\_G\_rig}$) is defined as:

$$En\_{Diff\_G\_rig} = G_{34} - G\_{rig\_center} \quad (1.14)$$

By plugging the formulae (1.11), (1.12), and (1.13) into (1.14), $En\_{Diff\_G\_rig}$ can be expressed as:

$$En\_{Diff\_G\_rig} = G_{34} - \frac{1}{8}[2(G_{14} + G_{54}) + G_{23} + G_{25} + G_{43} + G_{45}] \quad (1.15)$$

Step (d):

Perform edge enhancement to the center pixel (3, 3).

To suppress the noise's influence on the image edge enhancement, the weighted average of $En\_{Diff\_G\_cen}$, $En\_{Diff\_G\_lef}$ and $En\_{Diff\_G\_rig}$ is defined as:

$$En\_{Diff\_G} = \frac{1}{4}(En\_{Diff\_G\_lef} + 2En\_{Diff\_G\_cen} + En\_{Diff\_G\_rig}) \quad (1.16)$$

By plugging the formulae (1.5), (1.10), (1.15) into (1.16), the weighted average can be expressed as:

$$En\_{Diff\_G} = \frac{1}{4}(G_{32} + 2G_{33} + G_{34}) - \frac{1}{32}[4(G_{12} + G_{14} + G_{52} + G_{54}) + 6(G_{23} + G_{43}) + G_{21} + G_{41} + G_{25} + G_{45}] \quad (1.17)$$

The new value of the three components R, G and B of the center pixel (3, 3) after edge enhancement is:

$$R_{33\_new} = R_{33} + Edge\_{Gain} * En\_{Diff\_G};$$

$$G_{33\_new} = G_{33} + Edge\_{Gain} * En\_{Diff\_G};$$

$$B_{33\_new} = B_{33} + Edge\_{Gain} * En\_{Diff\_G}.$$

Option (2):

If Min__$_{HV}$<Min__$_{XY}$, and H-V>TH__$_{edge}$, treat the center pixel as a pixel on the vertical edge and perform edge enhancement to the center pixel on the vertical edge.

Step (a):

Determine the difference (En__$_{Diff\_G\_cen}$) between the value of the green component of the center pixel ($G_{33}$) and the value of the green component of the edge center of the edge at which the center pixel (3,3) is located.

First, the value (G__$_{center}$) of the green component of the edge center is defined as:

$$G\_center = \frac{1}{2}\left[\frac{1}{2}(G_{31} + G_{35}) + \frac{1}{2}(G_{32} + G_{34})\right] \quad (1.18)$$

In the formula (1.18), $G_{32}$ and $G_{34}$ are known, but $G_{31}$ and $G_{35}$ are unknown. Because the center pixel is deemed to be a pixel on the horizontal edge, $G_{31}$ and $G_{35}$ can be treated as pixels on the horizontal edge, i.e., $$G_{31} = \frac{1}{2}(G_{21} + G_{41}) \quad (1.19)$$

$$G_{35} = \frac{1}{2}(G_{25} + G_{45}) \quad (1.20)$$

Note that the green component difference (En__$_{Diff\_G\_cen}$) is defined as:

$$En\_Diff\_G\_cen = G_{33} - G\_center \quad (1.21)$$

By plugging the formulae (1.18), (1.19), and (1.20) into (1.21), En__$_{Diff\_G\_cen}$ can be expressed as:

$$En\_Diff\_G\_cen = G_{33} - \frac{1}{8}[2(G_{32} + G_{34}) + G_{21} + G_{41} + G_{25} + G_{45}] \quad (1.22)$$

Step (b):

Determine the green component difference (En__$_{Diff\_G\_up}$) associated with the pixel (2, 3) above the center pixel (3, 3).

First, the value (G__$_{up\_center}$) of the green component of the edge center corresponding to the pixel (2, 3) is defined as:

$$G\_up\_center = \frac{1}{2}\left[\frac{1}{2}(G_{21} + G_{25}) + \frac{1}{2}(G_{22} + G_{24})\right] \quad (1.23)$$

In the formula (1.23), $G_{21}$ and $G_{25}$ are known, but $G_{22}$ and $G_{24}$ are unknown. Because the center pixel is a pixel on the horizontal edge, $G_{22}$ and $G_{24}$ can be treated as a pixel on the horizontal edge, i.e., $$G_{22} = \frac{1}{2}(G_{12} + G_{32}) \quad (1.24)$$

$$G_{24} = \frac{1}{2}(G_{14} + G_{34}) \quad (1.25)$$

Note that the green component difference (En__$_{Diff\_G\_up}$) is defined as:

$$En\_Diff\_G\_up = G_{23} - G\_up\_center \quad (1.26)$$

By plugging the formulae (1.23), (1.24), and (1.25) into (1.26), En__$_{Diff\_G\_up}$ can be expressed as:

$$En\_Diff\_G\_up = G_{23} - \frac{1}{8}[2(G_{21} + G_{25}) + G_{12} + G_{32} + G_{14} + G_{34}] \quad (1.27)$$

Step (c):

Determine the green component difference (En__$_{Diff\_G\_dow}$) associated with the the pixel (4, 3) below the center pixel (3, 3).

First, the value (G__$_{dow\_center}$) of the green component of the edge center corresponding to the pixel (4, 3) is defined as:

$$G\_dow\_center = \frac{1}{2}\left[\frac{1}{2}(G_{41} + G_{45}) + \frac{1}{2}(G_{42} + G_{44})\right] \quad (1.28)$$

In the formula (1.28), $G_{41}$ and $G_{45}$ are known, but $G_{42}$ and $G_{44}$ are unknown. Because the center pixel is a pixel on the vertical edge, $G_{42}$ and $G_{44}$ can be treated as a pixel on the vertical edge, i.e., $$G_{42} = \frac{1}{2}(G_{32} + G_{52}) \quad (1.29)$$

$$G_{44} = \frac{1}{2}(G_{34} + G_{54}) \quad (1.30)$$

Note that the green component difference (En__$_{Diff\_G\_dow}$) is defined as:

$$En\_Diff\_G\_dow = G_{43} - G\_dow\_center \quad (1.31)$$

By plugging the formulae (1.28), (1.29), and (1.30) into (1.31), En__$_{Diff\_G\_dow}$ can be expressed as:

$$En\_Diff\_G\_dow = G_{43} - \frac{1}{8}[2(G_{41} + G_{45}) + G_{32} + G_{52} + G_{34} + G_{54}] \quad (1.32)$$

Step (d):

Perform edge enhancement to the center pixel (3, 3).

To suppress the noise's influence on the image edge enhancement, the weighted average of En__$_{Diff\_G\_cen}$, En__$_{Diff\_G\_up}$ and En__$_{Diff\_G\_dow}$ is defined as:

$$En\_Diff\_G = \frac{1}{4}(En\_Diff\_G\_up + 2En\_Diff\_G\_cen + En\_Diff\_G\_dow) \quad (1.33)$$

By plugging the formulae (1.22), (1.27), and (1.32) into (1.33), the weighted average can be expressed as:

$$En\_Diff\_G = \frac{1}{4}(G_{23} + 2G_{33} + G_{43}) - \frac{1}{32}[4(G_{21} + G_{41} + G_{25} + G_{45}) + 6(G_{32} + G_{34}) + G_{12} + G_{14} + G_{52} + G_{54}] \quad (1.34)$$

The new value of the three components R, G and B of the center pixel (3, 3) after edge enhancement is:

$$R_{33\_new} = R_{33} + \text{Edge}\_Gain * En\_Diff\_G;$$

$$G_{33\_new} = G_{33} + \text{Edge}\_Gain * En\_Diff\_G;$$

$$B_{33\_new} = B_{33} + \text{Edge}\_Gain * En\_Diff\_G.$$

Option (3):

If Min__$_{HV}$>Min__$_{XY}$, and X-Y<-TH__$_{edge}$, treat the center pixel as a pixel on the 135 degree edge and perform edge enhancement to the center pixel on the 135 degree edge.

First, the value ($G_{\_center}$) of the green component of the edge center is defined as: (please modify the formula 1.35)

$$G_{\_center} = \frac{1}{2}/(G_{24} + G_{42})  \qquad (1.35)$$

In the formula (1.35), $G_{24}$ and $G_{42}$ are unknown. Because the center pixel is treated as a pixel on the 135 degree edge, $G_{24}$ and $G_{42}$ can be treated as a pixel on the 135 degree edge, i.e., $$G_{24} = \frac{1}{4}(G_{14} + G_{25} + G_{34} + G_{23}) \qquad (1.36)$$

$$G_{42} = \frac{1}{4}(G_{41} + G_{32} + G_{43} + G_{52}) \qquad (1.37)$$

Note that the green component difference ($En\_{Diff\_G\_cen}$) is defined as:

$$En\_{Diff\_G\_cen} = G_{33} - G_{\_center} \qquad (1.38)$$

By plugging the formulae (1.35), (1.36), and (1.37) into (1.38), $En\_{Diff\_G\_cen}$ can be expressed as:

$$En\_{Diff\_G} = En\_{Diff\_G\_cen} = \qquad (1.39)$$
$$G_{33} - \frac{1}{8}(G_{14} + G_{25} + G_{41} + G_{52} + G_{32} + G_{34} + G_{23} + G_{43})$$

The new value of the three components R, G and B of the center pixel (3, 3) after edge enhancement is:

$$R_{33\_new} = R_{33} + Edge\_{Gain} * En\_{Diff\_G};$$

$$G_{33\_new} = G_{33} + Edge\_{Gain} * En\_{Diff\_G};$$

$$B_{33\_new} = B_{33} + Edge\_{Gain} * En\_{Diff\_G}.$$

Option (4):

If $Min\_{HV} > Min\_{XY}$, and $X-Y > TH\_{edge}$, treat the center pixel as a pixel on the 45 degree edge and perform edge enhancement to the center pixel on the 45 degree edge.

First, the value ($G_{\_center}$) of the green component of the edge center is defined as:

$$G_{\_center} = \frac{1}{2}(G_{22} + G_{44}) \qquad (1.40)$$

In the formula (1.40), $G_{22}$ and $G_{44}$ are unknown. Because the center pixel is deemed to be a pixel on the 45 degree edge, $G_{22}$ and $G_{44}$ can be treated as pixels on the 45 degree edge, i.e., $$G_{22} = \frac{1}{4}(G_{12} + G_{21} + G_{32} + G_{23}) \qquad (1.41)$$

$$G_{44} = \frac{1}{4}(G_{45} + G_{54} + G_{43} + G_{34}) \qquad (1.42)$$

Note that the green component difference ($En\_{Diff\_G\_cen}$) is defined as:

$$En\_{Diff\_G\_cen} = G_{33} - G_{\_center} \qquad (1.43)$$

By plugging the formulae (1.40), (1.41), and (1.42) into (1.43), $En\_{Diff\_G\_cen}$ can be expressed as:

$$En\_{Diff\_G} = En\_{Diff\_cen} = \qquad (1.44)$$
$$G_{33} - \frac{1}{8}(G_{12} + G_{21} + G_{45} + G_{54} + G_{32} + G_{34} + G_{23} + G_{45})$$

The new value of the three components R, G and B of the center pixel (3, 3) after edge enhancement is:

$$R_{33\_new} = R_{33} + Edge\_{Gain} * En\_{Diff\_G};$$

$$G_{33\_new} = G_{33} + Edge\_{Gain} * En\_{Diff\_G};$$

$$B_{33\_new} = B_{33} + Edge\_{Gain} * En\_{Diff\_G}.$$

Scenario Two:

The original color component of the center pixel is red and perform the edge enhancement to the center pixel as shown in FIG. 3.

Option (1):

If $Min\_{HV} < Min\_{XY}$, and $H-V < -TH\_{edge}$, treat the center pixel as a pixel on the horizontal edge and perform edge enhancement to the center pixel on the horizontal edge.

By analogy to the option (1) of the scenario one, the weighted average can be expressed as:

$$En\_{Diff\_G} = \frac{1}{4}(G_{32} + 2G_{33} + G_{34}) - \frac{1}{32}[4(G_{12} + G_{14} + G_{52} + G_{54}) + \qquad (2.1)$$
$$6(G_{23} + G_{43}) + G_{21} + G_{41} + G_{25} + G_{45}]$$

The new value of the three components R, G and B of the center pixel (3, 3) after edge enhancement is:

$$R_{33\_new} = R_{33} + Edge\_{Gain} * En\_{Diff\_G};$$

$$G_{33\_new} = G_{33} + Edge\_{Gain} * En\_{Diff\_G};$$

$$B_{33\_new} = B_{33} + Edge\_{Gain} * En\_{Diff\_G}.$$

Option (2):

If $Min\_{HV} < Min\_{XY}$, and $H-V > TH\_{edge}$, treat the center pixel as a pixel on the vertical edge and perform edge enhancement to the pixel on the vertical edge.

By analogy to the option (2) of the scenario one, the weighted average can be expressed as:

$$En\_{Diff\_G} = \frac{1}{4}(G_{23} + 2G_{33} + G_{43}) - \frac{1}{32}[4(G_{21} + G_{41} + G_{25} + G_{45}) + \qquad (2.2)$$
$$6(G_{32} + G_{34}) + G_{12} + G_{14} + G_{52} + G_{54}]$$

The new value of the three components R, G and B of the center pixel (3, 3) after edge enhancement is:

$$R_{33\_new} = R_{33} + Edge\_{Gain} * En\_{Diff\_G};$$

$$G_{33\_new} = G_{33} + Edge\_{Gain} * En\_{Diff\_G};$$

$$B_{33\_new} = B_{33} + Edge\_{Gain} * En\_{Diff\_G}.$$

Option (3):

If $Min\_{HV} > Min\_{XY}$, and $X-Y < -TH\_{edge}$, treat the center pixel as a pixel on the 135 degree edge and perform edge enhancement for the pixel on the 135 degree edge.

By analogy to the option (3) of the scenario one, the weighted average can be expressed as:

$$En\_Diff\_G = En\_Diff\_G\_cen = \qquad (2.3)$$
$$G_{33} - \frac{1}{4}(G_{14} + G_{25} + G_{41} + G_{52} + G_{32} + G_{34} + G_{23} + G_{43})$$

The new value of the three components R, G and B of the center pixel (3, 3) after edge enhancement is:

$R_{33\_new} = R_{33} + \text{Edge\_Gain} * En\_Diff\_G;$ $G_{33\_new} = G_{33} + \text{Edge\_Gain} * En\_Diff\_G;$ $B_{33\_new} = B_{33} + \text{Edge\_Gain} * En\_Diff\_G.$ Option (4):

If $\text{Min}\_{HV} > \text{Min}\_{XY}$, and $X-Y > TH\_{edge}$, treat the center pixel as a pixel on the 45 degree edge and perform edge enhancement for the pixel on the 45 degree edge.

By analogy to the option (4) of the scenario one, the weighted average can be expressed as:

$$En\_Diff\_G = En\_Diff\_G\_cen = \qquad (2.4)$$
$$G_{33} - \frac{1}{4}(G_{12} + G_{21} + G_{45} + G_{54} + G_{32} + G_{34} + G_{23} + G_{43})$$

The new value of the three components R, G and B of the center pixel (3, 3) after edge enhancement is:

$R_{33\_new} = R_{33} + \text{Edge\_Gain} * En\_Diff\_G;$ $G_{33\_new} = G_{33} + \text{Edge\_Gain} * En\_Diff\_G;$ $B_{33\_new} = B_{33} + \text{Edge\_Gain} * En\_Diff\_G.$ Scenario Three:

The original color component of the center pixel is green and the pixels that are on the left and right sides of the center pixel are blue, perform the edge enhancement to the center pixel as shown in FIG. 4.

Option (1):

If $\text{Min}\_{HV} < \text{Min}\_{XY}$, and $H-V < -TH\_{edge}$, treat the center pixel as a pixel on the horizontal edge and perform edge enhancement to the center pixel on the horizontal edge.

Step (a):

Determine the difference ($En\_Diff\_G\_cen$) between the value of the green component of the center pixel ($G_{33}$) and the value of the green component of the edge center of the edge at which the center pixel (3,3) is located.

First, the value ($G\_center$) of the green component of the edge center is defined as:

$$G\_center = \frac{1}{2}\left[\frac{1}{2}(G_{13} + G_{53}) + \frac{1}{2}(G_{23} + G_{43})\right] \qquad (3.1)$$

In the formula (3.1), $G_{13}$ and $G_{53}$ are known, but $G_{23}$ and $G_{43}$ are unknown. Because the center pixel is a pixel on the horizontal edge, $G_{23}$ and $G_{43}$ can be treated as pixels on the horizontal edge, i.e., $$G_{23} = \frac{1}{2}(G_{22} + G_{24}) \qquad (3.2)$$

$$G_{43} = \frac{1}{2}(G_{42} + G_{44}) \qquad (3.3)$$

Note that the green component difference ($En\_Diff\_G\_cen$) is defined as:

$$En\_Diff\_G\_cen = G_{33} - G\_center \qquad (3.4)$$

By plugging the formulae (3.1), (3.2), and (3.3) into (3.4), $En\_Diff\_G\_cen$ can be expressed as:

$$En\_Diff\_G\_cen = G_{33} - \frac{1}{8}[2(G_{13} + G_{53}) + G_{22} + G_{24} + G_{42} + G_{44}] \qquad (3.5)$$

Step (b):

Determine the green component difference ($En\_Diff\_G\_lef$) associated with the pixel (3, 2) left to the center pixel (3, 3).

First, the value ($G\_lef\_center$) of the green component of the edge center associated with the pixel (3, 2) is defined as:

$$G\_lef\_center = \frac{1}{2}\left[\frac{1}{2}(G_{12} + G_{52}) + \frac{1}{2}(G_{22} + G_{42})\right] \qquad (3.6)$$

In the formula (3.6), $G_{22}$ and $G_{42}$ are known, but $G_{12}$ and $G_{52}$ are unknown. Because the center pixel is a pixel on the horizontal edge, $G_{12}$ and $G_{52}$ can be treated as a pixel on the horizontal edge, i.e., $$G_{12} = \frac{1}{2}(G_{11} + G_{13}) \qquad (3.7)$$

$$G_{52} = \frac{1}{2}(G_{51} + G_{53}) \qquad (3.8)$$

Note that the green component difference ($En\_Diff\_G\_lef$) is defined as:

$$En\_Diff\_G\_lef = G_{32} - G\_lef\_center \qquad (3.9)$$

And $G_{32}$ can also be treated as a pixel on the horizontal edge, i.e., $$G_{32} = \frac{1}{2}(G_{31} + G_{33}) \qquad (3.10)$$

By plugging the formulae (3.6), (3.7), (3.8), and (3.10) into (3.9), $En\_Diff\_G\_lef$ can be expressed as:

$$En\_Diff\_G\_lef = \qquad (3.11)$$
$$\frac{1}{2}(G_{31} + G_{33}) - \frac{1}{8}[2(G_{22} - G_{42}) + G_{11} + G_{13} + G_{51} + G_{53}]$$

Step (c):

Determine the green component difference ($En\_Diff\_G\_rig$) associated with the pixel (3, 4) right to the center pixel (3, 3).

First, the value ($G\_rig\_center$) of the green component of the edge center corresponding to the pixel (3, 4) is defined as:

$$G\_rig\_center = \frac{1}{2}\left[\frac{1}{2}(G_{14} + G_{54}) + \frac{1}{2}(G_{24} + G_{44})\right] \qquad (3.12)$$

In the formula (3.12), $G_{24}$ and $G_{44}$ are known, but $G_{14}$ and $G_{54}$ are unknown. Because the center pixel is a pixel on the horizontal edge, $G_{14}$ and $G_{54}$ can be treated as a pixel on the horizontal edge, i.e., $$G_{14} = \frac{1}{2}(G_{13} + G_{15}) \tag{3.13}$$

$$G_{54} = \frac{1}{2}(G_{53} + G_{55}) \tag{3.14}$$

Note that the green component difference (En__Diff__G__rig) is defined as:

$$En\_Diff\_G\_rig = G_{34} - G\_rig\_center \tag{3.15}$$

And $G_{34}$ can also be treated as a pixel on the horizontal edge, i.e., $$G_{34} = \frac{1}{2}(G_{33} + G_{35}) \tag{3.16}$$

By plugging the formulae (3.12), (3.13), (3.14), and (3.16) into (3.15), the weighed average can be expressed as:

$$En\_Diff\_G\_rig = \tag{3.17}$$
$$\frac{1}{2}(G_{33} + G_{35}) - \frac{1}{8}[2(G_{24} + G_{44}) + G_{13} + G_{15} + G_{53} + G_{55}]$$

Step (d):
Perform edge enhancement to the center pixel.
To suppress the noise's influence on the image edge enhancement, the weighted average of En__Diff__G__cen, En__Diff__G__lef and En__Diff__G__rig is defined as:

$$En\_Diff\_G = \frac{1}{4}(En\_Diff\_G\_lef + 2En\_Diff\_G\_cen + En\_Diff\_G\_rig) \tag{3.18}$$

By plugging the formulae (3.5), (3.11), and (3.17) into (3.18), the weighted average can be expressed as:

$$En\_Diff\_G = \frac{1}{8}(G_{31} + 6G_{33} + G_{35}) - \frac{1}{32}[4(G_{22} + G_{24} + G_{42} + G_{44}) + 6(G_{13} + G_{53}) + G_{11} + G_{15} + G_{51} + G_{55}] \tag{3.19}$$

The new value of the three components R, G and B of the center pixel (3, 3) after edge enhancement is:

$$R_{33\_new} = R_{33} + Edge\_Gain * En\_Diff\_G;$$

$$G_{33\_new} = G_{33} + Edge\_Gain * En\_Diff\_G;$$

$$B_{33\_new} = B_{33} + Edge\_Gain * En\_Diff\_G.$$

Option (2):
If Min__HV<Min__XY, and H−V>TH__edge, treat the center pixel as a pixel on the vertical edge and perform edge enhancement for the pixel on the vertical edge.
Step (a):
Determine the difference (En__Diff__G__cen) between the value of the green component of the center pixel ($G_{33}$) and the value of the green component of the edge center of the edge at which the center pixel (3,3) is located.

First, the value ($G\_center$) of the green component of the edge center is defined as:

$$G\_center = \frac{1}{2}\left[\frac{1}{2}(G_{31} + G_{35}) + \frac{1}{2}(G_{32} + G_{34})\right] \tag{3.20}$$

In the formula (3.20), $G_{31}$ and $G_{35}$ are known, but $G_{32}$ and $G_{34}$ are unknown. Because the center pixel is deemed to be a pixel on the horizontal edge, $G_{32}$ and $G_{34}$ can be treated as pixels on the horizontal edge, i.e., $$G_{32} = \frac{1}{2}(G_{22} + G_{42}) \tag{3.21}$$

$$G_{34} = \frac{1}{2}(G_{24} + G_{44}) \tag{3.22}$$

Note that the green component difference (En__Diff__G__cen) is defined as:

$$En\_Diff\_G\_cen = G_{33} - G\_center \tag{3.23}$$

By plugging the formulae (3.20), (3.21), and (3.22) into (3.23), En__Diff__G__cen can be expressed as:

$$En\_Diff\_G\_cen = G_{33} - \frac{1}{8}[2(G_{31} + G_{35}) + G_{22} + G_{24} + G_{42} + G_{44}] \tag{3.24}$$

Step (b):
Determine the green component difference (En__Diff__G__up) associated with the pixel (2, 3) above the center pixel (3, 3).
First, the value ($G\_up\_center$) of the green component of the edge center corresponding to the pixel (2, 3) is defined as:

$$G\_up\_center = \frac{1}{2}\left[\frac{1}{2}(G_{21} + G_{25}) + \frac{1}{2}(G_{22} + G_{24})\right] \tag{3.25}$$

In the formula (3.25), $G_{22}$ and $G_{24}$ are known, but $G_{21}$ and $G_{25}$ are unknown. Because the center pixel is a pixel on the vertical edge, $G_{21}$ and $G_{25}$ can be treated as a pixel on the vertical edge, i.e., $$G_{21} = \frac{1}{2}(G_{11} + G_{31}) \tag{3.26}$$

$$G_{25} = \frac{1}{2}(G_{15} + G_{35}) \tag{3.27}$$

Note that the green component difference (En__Diff__G__up) is defined as:

$$En\_Diff\_G\_up = G_{23} - G\_up\_center \tag{3.28}$$

And $G_{23}$ can also be treated as a pixel on the vertical edge, i.e., $$G_{23} = \frac{1}{2}(G_{13} + G_{33}) \tag{3.29}$$

By plugging the formulae (3.25), (3.26), (3.27), (3.29) and (3.28):

$$En\_{Diff\_G\_up} = \frac{1}{2}(G_{13} + G_{33}) - \frac{1}{8}[2(G_{22} + G_{24}) + G_{11} + G_{31} + G_{15} + G_{35}] \quad (3.30)$$

Step (c):

Determine the green component difference ($En\_{Diff\_G\_dow}$) associated with the pixel (4, 3) below the center pixel (3, 3).

First, the value ($G\_{dow\_center}$) of the green component of the edge center corresponding to the pixel (4, 3) is defined as:

$$G\_{dow\_center} = \frac{1}{2}\left[\frac{1}{2}(G_{41} + G_{45}) + \frac{1}{2}(G_{42} + G_{44})\right] \quad (3.31)$$

In the formula (3.31), $G_{42}$ and $G_{44}$ are known, but $G_{41}$ and $G_{45}$ are unknown. Because the center pixel is a pixel on the vertical edge, $G_{41}$ and $G_{45}$ can be treated as a pixel on the vertical edge, i.e., $$G_{41} = \frac{1}{2}(G_{31} + G_{51}) \quad (3.32)$$

$$G_{45} = \frac{1}{2}(G_{35} + G_{55}) \quad (3.33)$$

Note that the green component difference ($En\_{Diff\_G\_dow}$) is defined as:

$$En\_{Diff\_G\_dow} = G_{43} - G\_{dow\_center} \quad (3.34)$$

And $G_{43}$ can also be treated as a pixel on the vertical edge, i.e., $$G_{43} = \frac{1}{2}(G_{53} + G_{33}) \quad (3.35)$$

By plugging the formulae (3.31), (3.32), (3.33), and (3.35) into (3.34), $En\_{Diff\_G\_dow}$ can be expressed as:

$$En\_{Diff\_G\_dow} = \frac{1}{2}(G_{53} + G_{33}) - \frac{1}{8}[2(G_{42} + G_{44}) + G_{31} + G_{51} + G_{35} + G_{55}] \quad (3.36)$$

Step (d):

Performing edge enhancement to the center pixel (3, 3).

To suppress the noise's influence on the image edge enhancement, the weighted average of $En\_{Diff\_G\_cen}$, $En\_{Diff\_G\_up}$ and $En\_{Diff\_G\_dow}$ is defined as:

$$En\_{Diff\_G} = \frac{1}{4}(En\_{Diff\_G\_up} + 2En\_{Diff\_G\_cen} + En\_{Diff\_G\_dow}) \quad (3.37)$$

By plugging the formulae (3.24), (3.30), and (3.36) into (3.37), the weighted average can be expressed as:

$$En\_{Diff\_G} = \frac{1}{8}(G_{13} + 6G_{33} + G_{53}) - \frac{1}{32}[4(G_{22} + G_{24} + G_{42} + G_{44}) + 6(G_{31} + G_{35}) + G_{11} + G_{15} + G_{51} + G_{55}] \quad (3.38)$$

The new value of the three components R, G and B of the center pixel (3, 3) after edge enhancement is:

$R_{33\_new} = R_{33} + Edge\_{Gain} * En\_{Diff\_G}$;

$G_{33\_new} = G_{33} + Edge\_{Gain} * En\_{Diff\_G}$;

$B_{33\_new} = B_{33} + Edge\_{Gain} * En\_{Diff\_G}$.

Option (3):

If $Min\_{HV} > Min\_{XY}$, and $X - Y < -TH\_{edge}$, treat the center pixel as a pixel on the 135 degree edge and perform edge enhancement for the center pixel on the 135 degree edge.

Step (a):

Determine the difference ($En\_{Diff\_G\_cen}$) between the value of the green component of the center pixel ($G_{33}$) and the value of the green component of the edge center of the edge at which the center pixel (3,3) is located.

First, the value ($G\_{center}$) of the green component of the edge center is defined as:

$$G\_{center} = \frac{1}{2}\left[\frac{1}{2}(G_{15} + G_{51}) + \frac{1}{2}(G_{24} + G_{42})\right] \quad (3.39)$$

And the green component difference ($En\_{Diff\_G\_cen}$) is defined as:

$$En\_{Diff\_G\_cen} = G_{33} - G\_{center} \quad (3.40)$$

By plugging the formula (3.39) into (3.40), $En\_{Diff\_G\_cen}$ can be expressed as:

$$En\_{Diff\_G\_cen} = G_{33} - \frac{1}{4}(G_{15} + G_{51} + G_{24} + G_{42}) \quad (3.41)$$

Step (b):

Determine the green component difference ($En\_{Diff\_G\_lu}$) associated with the pixel (2, 2) that is on the left upper side to the center pixel (3, 3).

First, the value ($G\_{lu\_center}$) of the green component of the edge center corresponding to the pixel (2, 2) is defined as:

$$G\_{lu\_center} = \frac{1}{2}(G_{13} + G_{31}) \quad (3.42)$$

And the green component difference ($En\_{Diff\_G\_lu}$) is defined as:

$$En\_{Diff\_G\_lu} = G_{22} - G\_{lu\_center} \quad (3.43)$$

By plugging the formula (3.42) into (3.43), $En\_{Diff\_G\_lu}$ can be expressed as:

$$En\_{Diff\_G\_lu} = G_{22} - \frac{1}{2}(G_{13} + G_{31}) \quad (3.44)$$

Step (c):

Determine the green component difference ($En\_Diff\_G\_rd$) of the edge center associated with the pixel (4, 4).

First, the value ($G\_rd\_center$) of the green component of the edge center corresponding to the pixel (4, 4) is defined as:

$$G_{\_rd\_center} = \frac{1}{2}(G_{35} + G_{53}) \quad (3.45)$$

And the green component difference ($En\_Diff\_G\_rd$) of the edge center associated with the pixel (4, 4) is:

$$En\_Diff\_G\_rd = G_{44} - G\_rd\_center \quad (3.46)$$

By plugging the formula (3.45) into (3.46), $En\_Diff\_G\_rd$ can be expressed as:

$$En_{\_Diff\_G\_rd} = G_{44} - \frac{1}{2}(G_{53} + G_{35}) \quad (3.47)$$

Step (d):

Perform edge enhancement to the center pixel.

To suppress the noise's influence on the image edge enhancement, the weighted average of $En\_Diff\_G\_cen$, $En\_Diff\_G\_lu$ and $En\_Diff\_G\_rd$ is defined as:

$$En_{\_Diff\_G} = \frac{1}{4}(En_{\_Diff\_G\_lu} + 2En_{\_Diff\_G\_cen} + En_{\_Diff\_G\_rd}) \quad (3.48)$$

By plugging the formulae (3.41), (3.44), and (3.47) into (3.48), the weighted average can be expressed as:

$$En_{\_Diff\_G} = \frac{1}{4}(G_{22} + 2G_{33} + G_{44}) - \quad (3.49)$$
$$\frac{1}{8}(G_{13} + G_{53} + G_{31} + G_{35} + G_{24} + G_{42} + G_{15} + G_{51})$$

The new value of the three components R, G and B of the center pixel (3, 3) after edge enhancement is:

$R_{33\_new} = R_{33} + Edge\_Gain * En\_Diff\_G;$ $G_{33\_new} = G_{33} + Edge\_Gain * En\_Diff\_G;$ $B_{33\_new} = B_{33} + Edge\_Gain * En\_Diff\_G.$ Option (4):

If $Min\_HV > Min\_XY$, and $X - Y > TH\_edge$, treat the center pixel as a pixel on the 45 degree edge and perform edge enhancement to the center pixel on the 45 degree edge.

Step (a):

Determine the green component difference ($En\_Diff\_G\_cen$) associated with the center pixel (3,3).

First, the value ($G_{center}$) of the green component of the edge center is defined as:

$$G_{\_center} = \frac{1}{2}\left[\frac{1}{2}(G_{11} + G_{55}) + \frac{1}{2}(G_{22} + G_{44})\right] \quad (3.50)$$

And the green component difference ($En\_Diff\_G\_cen$) of the edge center associated with the center pixel is:

$$En\_Diff\_G\_cen = G_{33} - G\_center \quad (3.51)$$

By plugging the formula (3.50) into (3.51), $En\_Diff\_G\_cen$ can be expressed as:

$$En_{\_Diff\_G\_cen} = G_{33} - \frac{1}{4}(G_{11} + G_{55} + G_{22} + G_{44}) \quad (3.52)$$

Step (b):

Determine the green component difference ($En\_Diff\_G\_ru$) associated with the pixel (2, 4) on the right upper side of the center pixel (3, 3).

First, the value ($G\_ru\_center$) of the green component of the edge center associated with the pixel (2, 4) is defined as:

$$G_{\_ru\_center} = \frac{1}{2}(G_{13} + G_{35}) \quad (3.53)$$

And the green component difference ($En\_Diff\_G\_ru$) of the edge associated with the pixel (2, 4) is defined as:

$$En\_Diff\_G\_ru = G_{24} - G\_ru\_center \quad (3.54)$$

By plugging the formula (3.53) into (3.54), $En\_Diff\_G\_ru$ can be expressed as:

$$En_{\_Diff\_G\_ru} = G_{24} - \frac{1}{2}(G_{13} + G_{35}) \quad (3.55)$$

Step (c):

Determine the green component difference ($En\_Diff\_G\_ld$) of the edge center associated with the pixel (4, 2) on the left lower side of the center pixel (3, 3).

First, the value ($G\_ld\_center$) of the green component of the edge center corresponding to the pixel (4, 2) on the left lower side of the center pixel is defined as:

$$G_{\_ld\_center} = \frac{1}{2}(G_{31} + G_{53}) \quad (3.56)$$

And the green component difference ($En\_Diff\_G\_ld$) of the edge center associated with the pixel (4, 2) is defined as:

$$En\_Diff\_G\_ld = G_{42} - G\_ld\_center \quad (3.57)$$

By plugging the formula (3.56) into (3.57), $En\_Diff\_G\_ld$ can be expressed as:

$$En_{\_Diff\_G\_ld} = G_{42} - \frac{1}{2}(G_{53} + G_{31}) \quad (3.58)$$

Step (d):

Performing edge enhancement to the center pixel.

To suppress the noise's influence on the image edge enhancement, the weighted average of $En\_Diff\_G\_cen$, $En\_Diff\_G\_ld$ and $En\_Diff\_G\_ru$ is defined as:

$$En_{\_Diff\_G} = \frac{1}{4}(En_{\_Diff\_G\_ld} + 2En_{\_Diff\_G\_cen} + En_{\_Diff\_G\_ru}) \quad (3.59)$$

By plugging the formulae (3.52), (3.55), and (3.58) into (3.59), the weighted average can be expressed as:

$$En\_Diff\_G = \frac{1}{4}(G_{24} + 2G_{33} + G_{42}) - \frac{1}{8}(G_{13} + G_{53} + G_{31} + G_{35} + G_{22} + G_{44} + G_{15} + G_{55}) \quad (3.60)$$

The new value of the three components R, G and B of the center pixel (3, 3) after edge enhancement is:

$R_{33\_new} = R_{33} + \text{Edge\_Gain} * En\_Diff\_G$;

$G_{33\_new} = G_{33} + \text{Edge\_Gain} * En\_Diff\_G$;

$B_{33\_new} = B_{33} + \text{Edge\_Gain} * En\_Diff\_G$.

Scenario Four:

If the original color component of the center pixel is green and the pixels that are on the left and right sides of the center pixel are red, perform the edge enhancement to the center pixel, as shown in FIG. 5.

Option (1):

If $\text{Min\_}_{HV} < \text{Min\_}_{XY}$ and $H-V < -TH\_edge$, treat the center pixel as a pixel on the horizontal edge and perform edge enhancement to center the pixel on the horizontal edge.

By analogy to the option (1) of the scenario three, $En\_Diff\_G$ can be expressed as:

$$En\_Diff\_G = \frac{1}{8}(G_{31} + 6G_{33} + G_{35}) - \frac{1}{32}[4(G_{22} + G_{24} + G_{42} + G_{44}) + 6(G_{13} + G_{53}) + G_{11} + G_{15} + G_{51} + G_{55}] \quad (4.1)$$

The new value of the three components R, G and B of the center pixel (3, 3) after edge enhancement is:

$R_{33\_new} = R_{33} + \text{Edge\_Gain} * En\_Diff\_G$;

$G_{33\_new} = G_{33} + \text{Edge\_Gain} * En\_Diff\_G$;

$B_{33\_new} = B_{33} + \text{Edge\_Gain} * En\_Diff\_G$.

Option (2):

If $\text{Min\_}_{HV} < \text{Min\_}_{XY}$, and $H-V > TH\_edge$, treat the center pixel as a pixel on the vertical edge and perform edge enhancement to the pixel on the vertical edge.

By analogy to the option (2) of the scenario three, $En\_Diff\_G$ can be expressed as:

$$En\_Diff\_G = \frac{1}{8}(G_{13} + 6G_{33} + G_{53}) - \frac{1}{32}[4(G_{22} + G_{24} + G_{42} + G_{44}) + 6(G_{31} + G_{35}) + G_{11} + G_{15} + G_{51} + G_{55}] \quad (4.2)$$

The new value of the three components R, G and B of the center pixel (3, 3) after edge enhancement is:

$R_{33\_new} = R_{33} + \text{Edge\_Gain} * En\_Diff\_G$;

$G_{33\_new} = G_{33} + \text{Edge\_Gain} * En\_Diff\_G$;

$B_{33\_new} = B_{33} + \text{Edge\_Gain} * En\_Diff\_G$.

Option (3):

If $\text{Min\_}_{HV} > \text{Min\_}_{XY}$, and $X-Y < -TH\_edge$, treat the center pixel as a pixel on the 135 degree edge and perform edge enhancement for the pixel on the 135 degree edge.

By analogy to the option (3) of the scenario three, $En\_Diff\_G$ can be expressed as:

$$En\_Diff\_G = \frac{1}{4}(G_{22} + 2G_{33} + G_{44}) - \frac{1}{8}(G_{13} + G_{53} + G_{31} + G_{35} + G_{24} + G_{42} + G_{15} + G_{51}) \quad (4.3)$$

The new value of the three components R, G and B of the center pixel (3, 3) after edge enhancement is:

$R_{33\_new} = R_{33} + \text{Edge\_Gain} * En\_Diff\_G$;

$G_{33\_new} = G_{33} + \text{Edge\_Gain} * En\_Diff\_G$;

$B_{33\_new} = B_{33} + \text{Edge\_Gain} * En\_Diff\_G$.

Option (4):

If $\text{Min\_}_{HV} > \text{Min\_}_{XY}$, and $X-Y > TH\_edge$, treat the center pixel as a pixel on the 45 degree edge and perform edge enhancement for the pixel on the 45 degree edge.

By analogy to the option (4) of the scenario three, $En\_Diff\_G$ can be expressed as:

$$En\_Diff\_G = \frac{1}{4}(G_{24} + 2G_{33} + G_{42}) - \frac{1}{8}(G_{13} + G_{53} + G_{31} + G_{35} + G_{22} + G_{44} + G_{15} + G_{55}) \quad (4.4)$$

The new value of the three components R, G and B of the center pixel (3, 3) after edge enhancement is:

$R_{33\_new} = R_{33} + \text{Edge\_Gain} * En\_Diff\_G$;

$G_{33\_new} = G_{33} + \text{Edge\_Gain} * En\_Diff\_G$;

$B_{33\_new} = B_{33} + \text{Edge\_Gain} * En\_Diff\_G$.

In some embodiments of the present invention, the aforementioned image edge enhancement process takes into account the influence of the green component values of different pixels surrounding the center pixel, and adopts a noise-resistant, self-adaptive edge enhancement algorithm, to suppress noise on the image edge. Thus, the resulting image has a clear image edge. In addition, the fact that the process performs image edge enhancement in the interpolation module based on the Bayer data can significantly reduce the consumption of memory space. Meanwhile, based on the Bayer data, the aforementioned image edge enhancement scheme can reduce the memory usage by performing edge enhancement using a small mount of memory space.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of image edge enhancement, comprising:
    determining edge trend for an image in accordance with second order gradient value of a center pixel in different directions;

performing interpolation operation with the center pixel, and calculating absent color components of pixels; and performing edge enhancement for the image in accordance with original color component of the center pixel and the edge trend of the image based on Bayer data, wherein the step of determining edge trend for an image in accordance with second order gradient value of a center pixel in different directions further comprises:

determining a second order gradient value H in the horizontal direction and a second order gradient value V in the vertical direction of the center pixel by a 3×5 Bayer matrix and a 5×3 Bayer matrix;

determining a second order gradient value X in the 135 degree direction and a second order gradient valve Y in the 45 degree direction of the center pixel by a 5×5 Bayer matrix;

comparing, respectively, a maximum Max_$_{HV}$ and a minimum Min_$_{HV}$ of H and V and a maximum Max_$_{XY}$ and a minimum Min_$_{XY}$ of X and Y with a predefined flat region threshold value TH_$_{flat}$;

if both Max_$_{HV}$ and Max_$_{XY}$ are smaller than TH_$_{flat}$, treating the center pixel as a pixel in a flat region;

if at least one of Max_$_{HV}$ and Max_$_{XY}$ is larger than or equal to TH_$_{flat}$, comparing Min_$_{HV}$ with Min_$_{XY}$;

if Min_$_{HV}$<Min_$_{XY}$ and H−V<−TH_$_{edge}$, treating the center pixel as a pixel on a horizontal edge;

if Min_$_{HV}$<Min_$_{XY}$ and H−V>TH_$_{edge}$, treating the center pixel as a pixel on a vertical edge;

if Min_$_{HV}$>Min_$_{XY}$ and X−Y<−TH_$_{edge}$, treating the center pixel as a pixel on an edge of 135 degree; and if Min_$_{HV}$>Min_$_{XY}$ and X−Y>TH_$_{edge}$, treating the center pixel as a pixel on an edge of 45 degree.

2. The method of image edge enhancement according to claim 1, wherein, if the original color component of the center pixel is blue, the second order gradient value H in the horizontal direction is:

$$H = \frac{2H_1 + H_2 + H_3}{4}$$

wherein, $H_1=|G_{32}-G_{34}|+|2B_{33}-B_{31}-B_{35}|;$ $H_2=|R_{22}-R_{24}|+|2G_{23}-G_{21}-G_{25}|;$ $H_3=|R_{42}-R_{44}|+|2G_{43}-G_{41}-G_{45}|;$ wherein the second order gradient value V in the vertical direction is:

$$V = \frac{2V_1 + V_2 + V_3}{4}$$

wherein, $V_1=|G_{23}-G_{43}|+|2B_{33}-B_{13}-B_{53}|;$ $V_2=|R_{22}-R_{42}|+|2G_{32}-G_{12}-G_{52}|;$ $V_3=|R_{24}-R_{42}|+|2G_{34}-G_{14}-G_{54}|.$

3. The method of image edge enhancement according to claim 2, wherein the second order gradient value X in the 135 degree direction is:

$X=|R_{22}-R_{44}|+|2B_{33}-B_{11}-B_{55}|;$ wherein the second order gradient value Y in the 45 degree direction is:

$Y=|R_{24}-R_{42}|+|2B_{33}-B_{15}-B_{51}|.$

4. The method of image edge enhancement according to claim 1, wherein, if the original component of the center pixel is red, the second order gradient value H in the horizontal direction is:

$$H = \frac{2H_1 + H_2 + H_3}{4}$$

wherein $H_1=|G_{32}-G_{34}|+|2R_{33}-R_{31}-R_{35}|;$ $H_2=|B_{22}-B_{24}|+|2G_{23}-G_{21}-G_{25}|;$ $H_3=|B_{42}-B_{44}|+|2G_{43}-G_{41}-G_{45}|;$ wherein the second order gradient value V in the vertical direction is:

$$V = \frac{2V_1 + V_2 + V_3}{4}$$

wherein, $V_1=|G_{23}-G_{43}|+|2R_{33}-R_{13}-R_{53}|;$ $V_2=|B_{22}-B_{42}|+|2G_{32}-G_{12}-G_{52}|;$ $V_3=|B_{24}-B_{44}|+|2G_{34}-G_{14}-G_{54}|;$

5. The method of image edge enhancement according to claim 4, wherein the second order gradient value X in the 135 degree direction is:

$X=|B_{22}-B_{44}|+|2R_{33}-R_{11}-R_{55}|;$ wherein the second order gradient value Y in the 45 degree direction is:

$Y=|B_{24}-B_{42}|+|2R_{33}-R_{15}-R_{51}|.$

6. The method of image edge enhancement according to claim 1, wherein, if the original component of the center pixel is green, and the original component of pixels that are in the left and right of the center pixel and are adjacent to it is blue, the second order gradient value H in the horizontal direction is:

$$H = \frac{2H_1 + H_2 + H_3}{4}$$

wherein, $H_1=|B_{32}-B_{34}|+|2G_{33}-G_{31}-G_{35}|;$ $H_2=|G_{22}-G_{24}|+|2R_{23}-R_{21}-R_{25}|;$ $H_3=|G_{42}-G_{44}|+|2R_{43}-R_{41}-R_{45}|;$ wherein the second order gradient value V in the vertical direction is:

$$V = \frac{2V_1 + V_2 + V_3}{4}$$

wherein, $V_1=|R_{23}-R_{43}|+|2G_{33}-G_{13}-G_{53}|;$ $V_2=|G_{22}-G_{42}|+|2B_{32}-B_{12}-B_{52}|;$ $V_3=|G_{24}-G_{44}|+|2B_{34}-B_{14}-B_{54}|.$

7. The method of image edge enhancement according to claim 6, wherein the second order gradient value X in the 135 degree direction is:

$X=|2G_{33}-G_{22}-G_{44}|+|2G_{33}-G_{11}-G_{55}|;$ wherein the second order gradient value Y in the 45 degree direction is:

$Y=|2G_{33}-G_{24}-G_{42}|+|2G_{33}-G_{15}-G_{51}|.$

8. The method of image edge enhancement according to claim 1, wherein, if the original component of the center pixel is green, and the original component of pixels that are in the left and right of the center pixel and are adjacent to it is red, the second order gradient value H in the horizontal direction is:

$$H = \frac{2H_1 + H_2 + H_3}{4}$$

wherein, $H_1=|R_{32}-R_{34}|+|2G_{33}-G_{31}-G_{35}|;$ $H_2=|G_{22}-G_{24}|+|2B_{23}-B_{21}-B_{25}|;$ $H_3=|G_{42}-G_{44}|+|2B_{43}-B_{41}-B_{45}|;$ wherein the second order gradient value V in the vertical direction is:

$$V = \frac{2V_1 + V_2 + V_3}{4}$$

wherein, $V_1=|B_{23}-B_{43}|+|2G_{33}-G_{13}-G_{53}|;$ $V_2=|G_{22}-G_{42}|+|2R_{32}-R_{12}-R_{52}|;$ $V_3=|G_{24}-G_{44}|+|2R_{34}-R_{14}-R_{54}|.$

9. The method of image edge enhancement according to claim 8, wherein the second order gradient value X in the 135 degree direction is:

$X=|2G_{33}-G_{22}-G_{44}|+|2G_{33}-G_{11}-G_{55}|;$ wherein the second order gradient value Y in the 45 degree direction is:

$Y=|2G_{33}-G_{24}-G_{42}|+|2G_{33}-G_{15}-G_{51}|.$

10. The method of image edge enhancement according to claim 1, wherein, the step of performing edge enhancement for the image in accordance with original color component of the center pixel and the edge trend of the image based on the Bayer data further comprises:

determining a brightness $Y\_{center}$ of an edge center based on the brightness of both sides of an edge of the center pixel;

determining a difference $En\_{Diff}$ of the brightness $Y_{33}$ of the center pixel and the brightness of the edge center;

determining whether the center pixel is on the dark side or bright side of the edge center; and determining a new value of the center pixel after performing edge enhancement $Y_{33\_new}=Y_{33}+Edge\_{Gain}*En\_{Diff}$.

11. The method of image edge enhancement according to claim 10, wherein, the brightness $Y\_{center}$ of the edge center is replaced with the value of the green component.

12. The method of image edge enhancement according to claim 10, wherein, the value range of $Edge\_{Gain}$ is 0~3.

13. The method of image edge enhancement according to claim 10, wherein, the new value of the center pixel after performing edge enhancement is:

$R_{33\_new}=R_{33}+Edge\_{Gain}*En\_{Diff\_G};$ $G_{33\_new}=G_{33}+Edge\_{Gain}*En\_{Diff\_G};$ $B_{33\_new}=B_{33}+Edge\_{Gain}*En\_{Diff\_G}.$

14. The method of image edge enhancement according to claim 1, wherein, if the original component of the center pixel is blue or red, and if the horizontal direction is deemed to be the edge trend, the difference $En\_{Diff\_G}$ of the value of the green component of the center pixel and the value of the edge center is defined as:

$$En\_{Diff\_G} = \frac{1}{4}(G_{32} + 2G_{33} + G_{34}) - \frac{1}{32}[4(G_{12} + G_{14} + G_{52} + G_{54}) + 6(G_{23} + G_{43}) + G_{21} + G_{41} + G_{25} + G_{45}];$$

if the vertical direction is deemed to be the edge trend, the difference $En\_{Diff\_G}$ of the value of the green component of the center pixel and the value of the edge center is defined as:

$$En\_{Diff\_G} = \frac{1}{4}(G_{23} + 2G_{33} + G_{43}) - \frac{1}{32}[4(G_{21} + G_{41} + G_{25} + G_{45}) + 6(G_{32} + G_{34}) + G_{12} + G_{14} + G_{52} + G_{54}];$$

if the 135 degree direction is deemed to be the edge trend, the difference $En\_{Diff\_G}$ of the value of the green component of the center pixel and the value of the edge center is defined as:

$$En\_{Diff\_G} = G_{33} - \frac{1}{8}(G_{14} + G_{25} + G_{41} + G_{52} + G_{32} + G_{34} + G_{23} + G_{43});$$

and if the 45 degree direction is deemed to be the edge trend, the difference $En\_{Diff\_G}$ of the value of the green component of the center pixel and the value of the edge center is defined as:

$$En\_{Diff\_G} = G_{33} - \frac{1}{8}(G_{12} + G_{21} + G_{45} + G_{54} + G_{32} + G_{34} + G_{23} + G_{43}).$$

15. The method of image edge enhancement according to claim 1, wherein, if the original component of the center pixel is green, and if the horizontal direction is deemed to be the edge trend, the difference $En\_{Diff\_G}$ of the value of the green component of the center pixel and the value of the edge center is defined as:

$$En\_{Diff\_G} = \frac{1}{8}(G_{31} + 6G_{33} + G_{35}) - \frac{1}{32}[4(G_{22} + G_{24} + G_{42} + G_{44}) + 6(G_{13} + G_{53}) + G_{11} + G_{15} + G_{51} + G_{55}];$$

if the vertical direction is defined to be the edge trend, the difference $En\_{Diff\_G}$ of the value of the green component of the center pixel and the value of the edge center is defined as:

$$En\_{Diff\_G} = \frac{1}{8}(G_{13} + 6G_{33} + G_{53}) - \frac{1}{32}[4(G_{22} + G_{24} + G_{42} + G_{44}) + 6(G_{31} + G_{35}) + G_{11} + G_{15} + G_{51} + G_{55}];$$

if the 135 degree direction is deemed to be the edge trend, the difference $En\_{Diff\_G}$ of the value of the green component of the center pixel and the value of the edge center is defined as:

$$En\_{Diff\_G} = \frac{1}{4}(G_{22} + 2G_{33} + G_{44}) - \frac{1}{8}(G_{13} + G_{53} + G_{31} + G_{35} + G_{24} + G_{42} + G_{15} + G_{51});$$

if the 45 degree direction is deemed to be the edge trend, the difference $En\_{Diff\_G}$ of the value of the green component of the center pixel and the value of the edge center is defined as:

$$En\_{Diff\_G} = \frac{1}{4}(G_{24} + 2G_{33} + G_{42}) - \frac{1}{8}(G_{13} + G_{53} + G_{31} + G_{35} + G_{22} + G_{44} + G_{15} + G_{55}).$$

* * * * *